(12) United States Patent
Van Den Ende et al.

(10) Patent No.: US 11,459,953 B2
(45) Date of Patent: Oct. 4, 2022

(54) GAS TURBINE ENGINE WITH FUEL-COOLED TURBINE

(71) Applicant: PRATT & WHITNEY CANADA CORP., Longueuil (CA)

(72) Inventors: Daniel Van Den Ende, Mississauga (CA); David Menheere, Norval (CA); Timothy Redford, Campbellville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/798,592

(22) Filed: Feb. 24, 2020

(65) Prior Publication Data

US 2021/0262391 A1    Aug. 26, 2021

(51) Int. Cl.
| F02C 7/16 | (2006.01) |
| F02C 7/22 | (2006.01) |
| F02C 3/08 | (2006.01) |
| F23R 3/28 | (2006.01) |

(52) U.S. Cl.
CPC ............. F02C 7/16 (2013.01); F02C 3/085 (2013.01); F02C 7/222 (2013.01); F23R 3/28 (2013.01); *F05D 2220/323* (2013.01); *F05D 2240/35* (2013.01); *F05D 2240/61* (2013.01); *F05D 2260/232* (2013.01)

(58) Field of Classification Search
CPC .. F02C 7/16; F02C 7/222; F02C 7/224; F02C 3/085; F23R 3/28; F23R 3/38; F05D 2260/232

See application file for complete search history.

(56) References Cited

U.S. PATENT DOCUMENTS

| 2,595,505 | A | * | 5/1952 | Bachle | ...................... | F23R 3/38 |
| | | | | | | 60/804 |
| 2,694,291 | A | * | 11/1954 | Rosengart | ................. | F23R 3/50 |
| | | | | | | 60/264 |
| 2,924,937 | A | * | 2/1960 | Leibach | ..................... | F23R 3/38 |
| | | | | | | 60/804 |
| 3,126,703 | A | * | 3/1964 | Oprecht | .................... | F02C 7/00 |
| | | | | | | 60/804 |
| 3,321,912 | A | * | 5/1967 | Oprecht | .................... | F23R 3/38 |
| | | | | | | 60/804 |
| 4,034,560 | A | * | 7/1977 | Chute | ..................... | F02C 3/085 |
| | | | | | | 60/39.08 |
| 4,490,622 | A | | 12/1984 | Osborn | | |
| 4,870,825 | A | * | 10/1989 | Chapman | .................. | F23R 3/38 |
| | | | | | | 60/745 |
| 6,966,174 | B2 | | 11/2005 | Paul | | |
| 6,983,606 | B2 | | 1/2006 | Brown | | |

(Continued)

*Primary Examiner* — Steven M Sutherland
(74) *Attorney, Agent, or Firm* — Norton Rose Fulbright Canada

(57) ABSTRACT

The gas turbine engine includes a combustion section including an annular swirl combustor having a combustor inlet, and a compressor section including a centrifugal compressor with an impeller, the impeller compressing and swirling an airflow and discharging the compressed and swirled airflow from the impeller outlet into the combustor inlet. The turbine section includes a radial turbine having a turbine fuel inlet and a turbine fuel outlet, the radial turbine receiving a flow of fuel at the turbine fuel inlet and discharging the flow of fuel from the turbine fuel outlet of the radial turbine into the combustor inlet.

17 Claims, 3 Drawing Sheets

(56) References Cited

U.S. PATENT DOCUMENTS

| | | |
|---|---|---|
| 7,896,620 B1 | 3/2011 | Ewing, Jr. |
| 8,006,500 B1 | 8/2011 | Wilson, III |
| 2005/0229601 A1* | 10/2005 | Thompson, Jr. ........ F02C 7/224 |
| | | 60/772 |

* cited by examiner

GAS TURBINE ENGINE WITH FUEL-COOLED TURBINE

TECHNICAL FIELD

The application relates generally to a gas turbine engine having a radial turbine, and, more particularly, to a gas turbine engine having a radial turbine and a "swirling" combustor.

BACKGROUND

Turbines are typically cooled using air which is fed through holes and passages within the turbine rotor and blades for cooling purposes. This requires cooling air to be directed to and through the turbine rotors, while fuel (which is also relatively cool) into the combustor for combustion purposes.

SUMMARY

In one aspect, there is provided a gas turbine engine, comprising: a combustion section including an annular swirl combustor having a combustor inlet; a compressor section including a centrifugal compressor with an impeller, the impeller having a plurality of impeller vanes and an impeller outlet disposed upstream of the combustor, the impeller compressing and swirling an airflow and discharging the compressed and swirled airflow from the impeller outlet into the combustor inlet; and a turbine section including a radial turbine having a turbine fuel inlet and a turbine fuel outlet, the radial turbine receiving a flow of fuel at the turbine fuel inlet and discharging the flow of fuel from the turbine fuel outlet of the radial turbine into the combustor inlet.

In another aspect, there is provided a method for combusting fuel in a gas turbine engine, comprising: compressing and swirling an airflow; directing the compressed and swirled airflow towards an annular swirl combustor; supplying a flow of fuel to a rotating radial turbine; slinging the flow of fuel into the annular swirl combustor using the rotating radial turbine; and combusting the mixture of compressed and swirled airflow and the flow of fuel slung into the annular swirl combustor.

In a further aspect, there is provided a method for cooling a rotating radial turbine in a gas turbine engine, comprising: supplying a flow of fuel to the rotating radial turbine; directing the flow of fuel through a turbine cooling path; and slinging the flow of fuel into an annular swirl combustor.

BRIEF DESCRIPTION OF THE DRAWINGS

Reference is now made to the accompanying figures in which.

DETAILED DESCRIPTION

Figure 1:
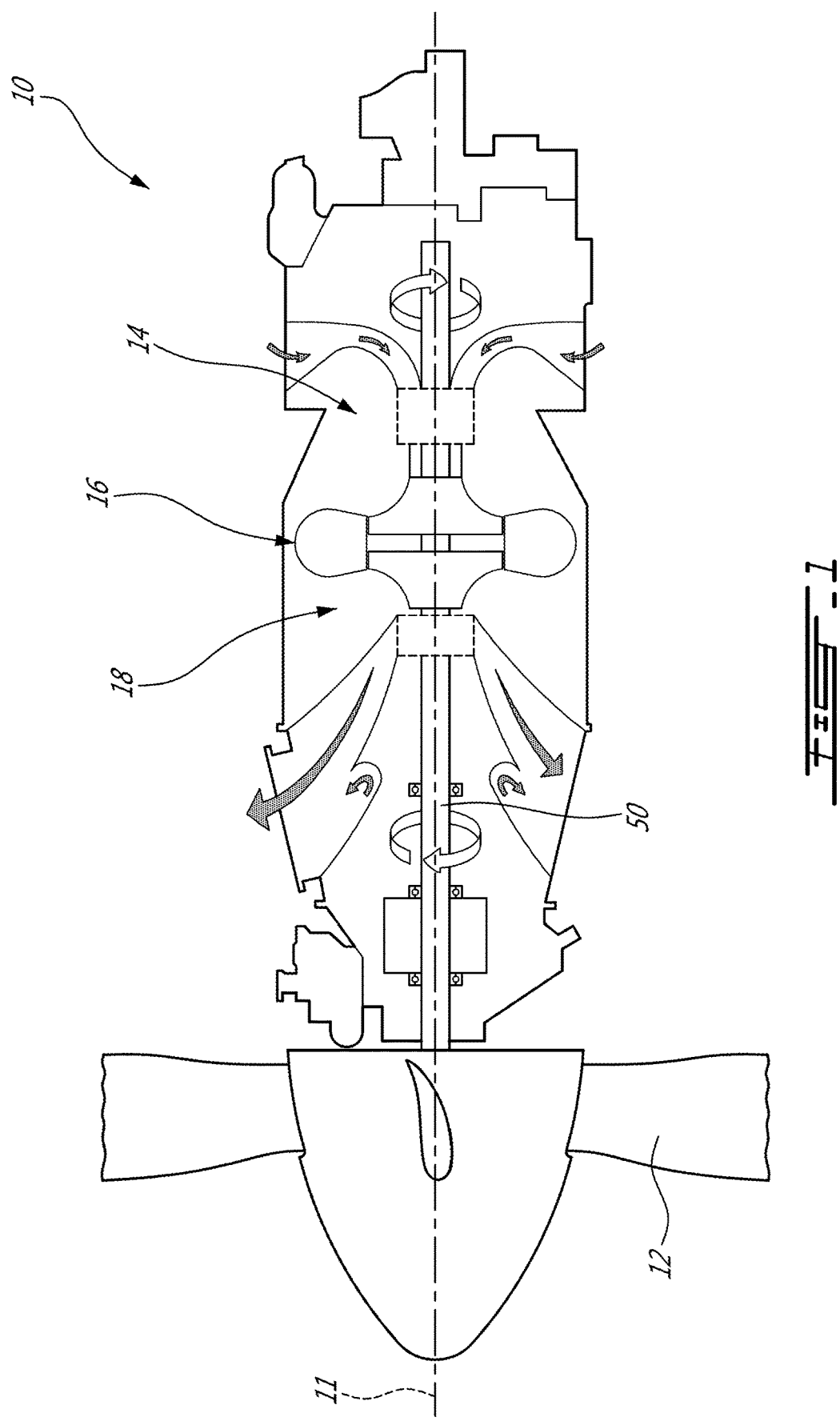
FIG. 1 is a schematic cross sectional view of a gas turbine engine.

FIG. 1 illustrates a gas turbine engine 10 of a type preferably provided for use in subsonic flight, and configured in this embodiment for driving a load 12, such as, but not limited to, a propeller 12 or, alternately, a helicopter rotor or rotorcraft rotor. Depending on the intended use, the engine 10 may be any suitable aircraft engine, and may be configured as a turboprop engine or a turboshaft engine. The gas turbine engine 10 generally comprising in serial flow communication a compressor section 14 for pressurizing air, a combustor section 16 in which the compressed air is mixed with fuel and ignited for generating an annular stream of hot combustion gases, and a turbine section 18 for extracting energy from the combusted gases. Also shown is a central longitudinal axis 11 of the engine 10.

As will be discussed in further detail below, gas turbine engine 10 is designed to be compact relative to traditional gas turbine engines, and thus includes features such as a swirling annular combustor 30 in the combustor section 16, a centrifugal compressor 20 in the compressor section 14, and a radial turbine 40 in the turbine section 18. In addition, gas turbine engine 10 is configured to operate without the need for any diffuser pipes or diffuser vanes as part of the centrifugal compressor 20, upstream of the combustor 30, as will be discussed in further detail below. Even though the present description and FIG. 1 may specifically refer to a turboprop engine as an example, it is understood that aspects of the present disclosure may be equally applicable to other types of combustion engines in general, and other types of gas turbine engines in particular, including but not limited to turboshaft or turbofan engines, auxiliary power units (APU), and the like.

Figure 2:
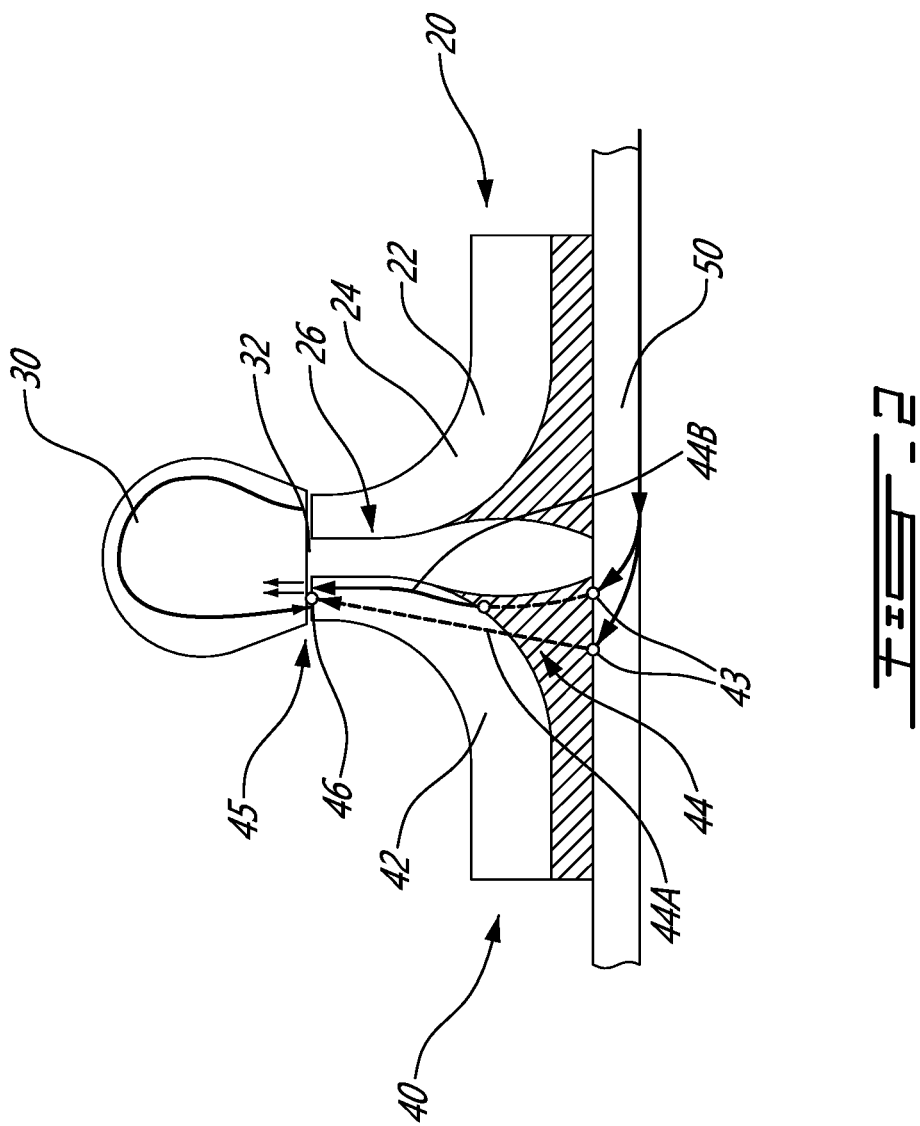
FIG. 2 is a schematic cross sectional view of a compressor, turbine and combustor assembly according to an embodiment of the present disclosure.

Referring now to FIG. 2, the compressor section 14 of the gas turbine engine 10 includes at least a centrifugal compressor 20 with an impeller 22 having a plurality of impeller vanes 24 configured to compress and swirl an inlet airflow within the compressor section 14. The compressor section 14 may however include other compression stages (either axial compressors or other centrifugal compressors), located further upstream of the centrifugal compressor 20. This compressed and swirled airflow is then supplied by the impeller 22 directly into a swirling combustor 30 of the combustor section 16 that extends annularly about the engine 10 at the exits of the impeller 22 of the centrifugal compressor 20. Unlike most centrifugal compressors, however, the centrifugal compressor 20 does not include any diffuser vanes or diffuser pipes between an outlet 24 of the impeller 22 and the inlet 32 of the combustor 30. As such, the flow exiting the outlet 26 of the vanes 24 of the impeller 22, and therefore entering the combustor 30, is a swirling airflow that is not "straightened out" prior to entering the combustor—as would be the case for air flowing through diffuser pipes and/or vane diffusers. The airflow within the combustor 30 therefore swirls around within the annular combustion chamber. Such a swirling combustor 30 (or "sling" combustor) is quite compact relative to traditional straight-flow or reverse-flow combustors typically used in gas turbine engines, and thus is lighter and occupies less space. Annular swirling combustor 30 is configured to receive the compressed and swirled airflow from the impeller 22 at a combustor inlet 32. Unlike with traditional combustors, diffuser pipes or diffuser vanes downstream of the impeller 22 are not required in order to divert the airflow towards the annular swirling combustor 30, as there is no need to un-swirl the flow of air before it enters the annular swirling combustor 30. The impeller outlet 26 is disposed immediately upstream of the combustor inlet 32, thus diverting the swirled airflow towards the annular swirling combustor 30.

Still referring to FIG. 2, turbine section 18 includes at least a radial turbine 40 having a plurality of turbine blades 42. In an embodiment, turbine section 18 is positioned immediately downstream of the combustor 30. As discussed above, the turbine blades 42 are driven by the exhaust from the combustor section 16 to extract energy, for example mechanical energy to power a rotor blade or electrical energy via a generator (not shown). In addition to their energy extraction role, however, the turbine blades 42 are configured to receive a flow of fuel and sling the flow of fuel into the annular swirling combustor 30.

In an embodiment, fuel is fed to the turbine blades 42 via one or more fuel flow paths extending through a hollow engine shaft 50, and then passes through a turbine cooling path to cool the turbine blades 42 before being slung outwardly into the annular swirling combustor 30. While FIG. 2 shows the fuel flow path extending through the hollow engine shaft 50, other possibilities for fuel delivery to the radial turbine 40, such as a dedicated fuel line, may be used. In the embodiment shown in FIG. 2, the turbine cooling path includes a turbine fuel inlet 43 leading to a plurality of fuel passages 44 formed in the body of each radial turbine 42. Other types of cooling paths may be used, as will be discussed in further detail below. As such, the fuel flowing through the turbine cooling path cools the turbine blades 42 before acting as a combustible in the annular swirling combustor 30, thus service a dual purpose. As the turbine blades 42 are rotating, the fuel passing through the turbine cooling path is forced towards the outer radii of the turbine blades 42 due to centrifugal forces where the fuel may exit the turbine cooling path via turbine fuel outlets 45, as discussed below.

By "slung" or "slingingly discharged", it is implied that the fuel is directed by the rotating turbine blades 42 (thereby acting as the "slinger") into the combustor inlet 32 of the annular swirling combustor 30 where it is combusted along with the compressed and swirled air from the compressor section 14. In the embodiment shown in FIG. 2, the fuel may exit via a turbine fuel outlet 45, illustratively apertures 46, at distal ends of the fuel passages 44 at the leading edges of the turbine blades 42 in a sprinkler or shower head-like manner. The fuel assumes this sprinkler or shower head-like discharge pattern due to the rotation of the turbine blades and the fact that the fuel is passing through apertures 46. In another embodiment, the fuel may exit from the hub (not shown) of the radial turbine 40 as it is slung towards the combustor inlet 32. The arrows in FIG. 2 demonstrate a possible path of the fuel, i.e. through the hollow engine shaft 50 to the radial turbine blade 42, through fuel passages 44 in the turbine blades 42 and then exiting through apertures 46 as it is slung into the combustor inlet 32.

Unlike traditional turbines in gas turbine engines which require vanes upstream of the turbine rotor 40 and downstream of the exit of the combustor 30, the shown embodiment does not require any turbine vanes as there is no need to de-swirl the combustion gas flow before it enters the rotating radial turbine 40. The flow of the compressed and swirled air continues to swirl around in the annular swirling combustor 30 in the same direction in which it exists the compressor section 14. As such, the angular velocity of the airflow in the annular swirling combustor 30 from the compressor section 16 assists the radial turbine 40 in directing fuel into the combustor inlet 30 without the need for turbine inlet vanes or the like. The fuel is directed towards the outer radii of the radial turbine 40 due to the centrifugal force of the rotating turbine blades 42 before being slung into the combustor inlet 32. In addition, the presence of vanes may potentially block the passage of fuel from entering the combustor inlet 32.

Figure 3:
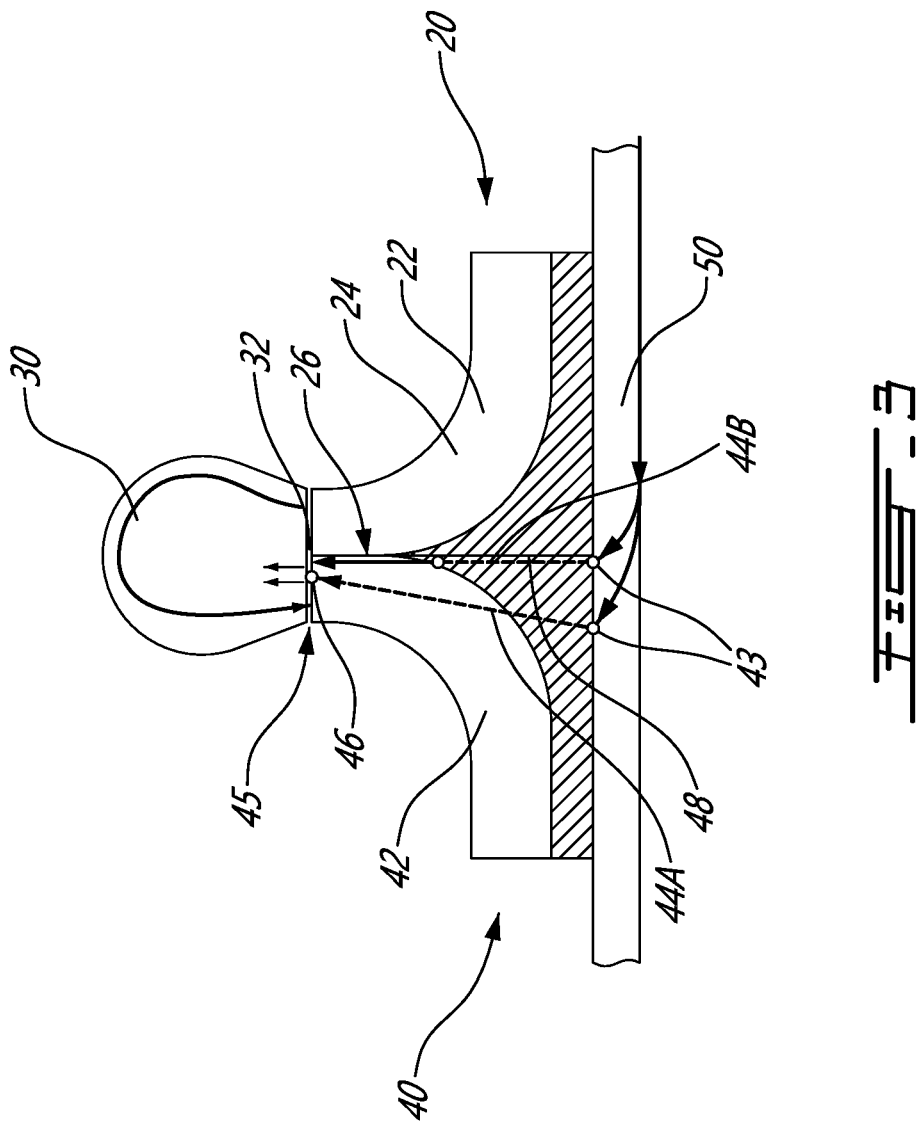
FIG. 3 is a schematic cross sectional view of a compressor, turbine and combustor assembly according to another embodiment of the present disclosure.

Referring now to FIG. 3, the impellor 22 of the centrifugal compressor 20 and the radial turbine 40 are arranged back to back, carrying similar but opposing loads. As such, in an alternate embodiment, these two components may be structurally joined. In such an embodiment, the fuel arriving at the turbine fuel inlet 43 flows over a rear face 48 of the radial turbine 40 to cool the radial turbine 40 and to reduce any thermal stresses. The arrows in FIG. 3 demonstrate a possible path of the fuel, i.e. through the hollow engine shaft 50 to the radial turbine blade 42, along the rear face 48 of the turbine blades 42 and then slung into the combustor inlet 32 as the fuel leaves the radial turbine 40 at the turbine fuel outlet 45.

According to the present disclosure, a method for combusting fuel in a gas turbine engine 10 is as follows. An airflow is compressed and swirled, for instance in a centrifugal compressor 20, and then directed towards an annular swirl combustor 30. Fuel is supplied, for instance via a hollow engine shaft 50, to a rotating radial turbine 40, the rotating action of which slings the fuel into the annular swirl combustor 30. Once supplied to the radial turbine 40, the fuel may flow along the turbine blades 42, for example through internal fuel passages 44A (as represented by broken-lines) in the turbine blades 42 or along a rear face 48 of the turbine blades 42 (i.e. fuel passage 44B), before being slung. The compressed and swirled airflow and the slung flow of fuel are mixed and then combusted in the annular swirl combustor 30.

The present disclosure also teaches a method for cooling a rotating radial turbine 40 blade in a gas turbine engine 10. Fuel is supplied, for instance via a hollow engine shaft 50, to the rotating radial turbine 40 and then directed through a turbine cooling path. Such a turbine cooling path may include, for instance, a plurality of fuel passages 44 formed in the body of the radial turbine 40 or a rear face 48 of the radial turbine. Once the radial turbine 40 has been cooled, the fuel is slung to an annular swirling combustor 30 so that it may be combusted along with air, for instance from a centrifugal compressor 20.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A gas turbine engine, comprising:
a combustion section including an annular swirl combustor having a combustor inlet and a combustor outlet;
a compressor section including a centrifugal compressor with an impeller, the impeller having a plurality of impeller vanes and an impeller outlet disposed upstream of the combustor, the impeller compressing and swirling an airflow and discharging the compressed and swirled airflow from the impeller outlet into the combustor via the combustor inlet; and
a turbine section including a radial turbine with a plurality of turbine blades, the turbine section having a turbine air inlet in communication with the combustor outlet for receiving swirling combustion gasses from the combustor, a turbine fuel inlet and a turbine fuel outlet defining a fuel flow path therebetween along at least one surface of the radial turbine, the turbine fuel outlet located at leading edges of the turbine blades and directed towards the turbine air inlet, the radial turbine receiving a flow of fuel at the turbine fuel inlet and directing the flow of fuel along the fuel flow path to discharge the flow of fuel from the turbine fuel outlet of the radial turbine and into the combustor.

2. The gas turbine engine as defined in claim 1, wherein the radial turbine is cooled by the flow of fuel flowing between the turbine fuel inlet and the turbine fuel outlet.

3. The gas turbine engine as defined in claim 1, further comprising a hollow engine shaft configured to transport the flow of fuel therethrough to the turbine section.

4. The gas turbine engine as defined in claim 1, wherein the turbine fuel inlet diverts the flow of fuel through a plurality of fuel passages formed in a body of the radial turbine.

5. The gas turbine engine as defined in claim 4, wherein the turbine fuel outlet includes a plurality of apertures at distal ends of the plurality of fuel passages.

6. The gas turbine engine as defined in claim 1, wherein the turbine fuel inlet diverts the flow of fuel along a rear face of the radial turbine.

7. The gas turbine engine as defined in claim 1, wherein the impeller and the radial turbine are structurally joined.

8. The gas turbine engine as defined in claim 1, wherein the turbine section is positioned immediately downstream of the combustion section.

9. A method for combusting fuel in a gas turbine engine, comprising:
    compressing and swirling an airflow;
    directing the compressed and swirled airflow towards a combustor inlet of an annular swirl combustor, the annular swirl combustor further having a combustor outlet;
    supplying a flow of fuel to a rotating radial turbine via a turbine fuel inlet at a hub of the rotating radial turbine;
    slinging the flow of fuel into the annular swirl combustor in a direction towards the combustor outlet, the flow of fuel exiting from a turbine fuel outlet at leading edges of turbine blades of the rotating radial turbine, the turbine fuel inlet and the turbine fuel outlet defining a fuel flow path therebetween along at least one surface of the radial turbine;
    combusting a mixture of the compressed and swirled airflow and the flow of fuel slung into the annular swirl combustor; and
    directing a flow of swirled combustion gasses from the combustor outlet to a turbine air inlet of the radial turbine, the turbine air inlet in communication with the combustor outlet and located at the turbine fuel outlet.

10. The method as defined in claim 9, wherein the airflow is compressed and swirled by a centrifugal compressor.

11. The method as defined in claim 9, further comprising transporting the flow of fuel through a hollow engine shaft to the rotating radial turbine.

12. The method as defined in claim 9, wherein supplying a flow of fuel to a rotating radial turbine includes feeding the flow of fuel through a plurality of fuel passages formed in a body of the radial turbine.

13. The method as defined in claim 9, wherein supplying a flow of fuel to a rotating radial turbine includes feeding the flow of fuel along a rear face of the radial turbine.

14. A method for cooling a rotating radial turbine in a gas turbine engine, comprising:
    supplying a flow of fuel to a fuel turbine fuel inlet at a hub of the rotating radial turbine;
    directing the flow of fuel through a turbine cooling path defined along at least one surface of the radial turbine between the turbine fuel inlet and a turbine fuel outlet located at leading edges of turbine blades of the rotating radial turbine; and
    slinging the flow of fuel from the turbine fuel outlet at a second end of the rotating radial turbine into a combustor outlet of an annular swirl combustor.

15. The method as defined in claim 14, wherein supplying the flow of fuel to the rotating radial turbine includes transporting the flow of fuel through a hollow engine shaft.

16. The method as defined in claim 14, wherein directing the flow of fuel through the turbine cooling path includes feeding the flow of fuel through a plurality of fuel passages formed in a body of the radial turbine.

17. The method as defined in claim 14, wherein directing the flow of fuel through the turbine cooling path includes feeding the flow of fuel along a rear face of the radial turbine.

\* \* \* \* \*